Oct. 21, 1941.     J. E. PADGETT     2,259,657
UNIVERSAL JOINT
Filed Sept. 13, 1938     2 Sheets-Sheet 1

Inventor
Joseph E. Padgett
By Strauch & Hoffman
Attorneys

Oct. 21, 1941.  J. E. PADGETT  2,259,657
UNIVERSAL JOINT
Filed Sept. 13, 1938  2 Sheets-Sheet 2

Inventor
Joseph E. Padgett

By Strauch & Hoffman
Attorneys

Patented Oct. 21, 1941

2,259,657

UNITED STATES PATENT OFFICE 2,259,657

UNIVERSAL JOINT

Joseph Edward Padgett, Toledo, Ohio

Application September 13, 1938, Serial No. 229,741

9 Claims. (Cl. 64—17)

The present invention relates to universal joints. More particularly, the invention is concerned with a universal joint capable of being installed between the drive and driven shaft sections in automobile or like assembly lines with the certainty that the characteristics of the joint will not be altered during the assembly operation.

The primary purpose of the present invention is to provide a universal joint in which a shaft coupling member is constructed as a separate unit from a yoke member, and in which the coupling member and the yoke are secured together by an interlock between them and by a threaded means, the latter of which are utilized merely to maintain the interlock, the correct assembly of the member being assured by the interlock.

Another object of the invention is to provide a universal joint so constructed as to permit its assembly between drive and driven shafts in such a way that no opportunity is afforded the person making the assembly to alter the operating characteristics of the joint, the construction of the joint being such that the joint can only be assembled in the correct manner.

Still another object of the invention is to provide a universal joint so designed that it may be produced in very much smaller size and of greatly reduced weight than was heretofore possible in universal joints capable of transmitting the same torque, whereby the cost of production is reduced and the liability of the accidental development of unbalance in the universal joint minimized.

Still another object of the invention is to provide a universal joint in which two of the yoke arms may be removed as a unit from the part or member of the joint that couples it to a shaft, key means being provided as a part of one of said members arranged to fit in a matching recess in the other member to locate said members with respect to each other and resist the torque independently of the threaded elements that are utilized merely to maintain the members in proper interlocked relation.

A still further object of the invention is to provide a universal joint of the type in which cups containing bearings are telescoped on the trunnions of the spider in which each of the cups is mounted in an eye-like opening in a yoke arm so that no pressure is exerted against the side of the cups, which constitutes the races for the bearings, so as to distort the same, and in which the cups are held in proper relation with respect to the axis of the shaft in which the joint is used by abutments the proper location of which is assured by the construction and necessary mode of assembly of the joint.

A still further object of the invention is to provide a universal joint of the type, in which a yoke member is made as a separate part from the coupling member that is connected to a shaft, and in which the yoke member is positioned with respect to the coupling member by lugs projecting from the coupling member into recesses in the yoke member, and in which the same lugs are utilized to maintain cups containing bearings on oppositely disposed trunnions of the spider and to properly center the spider with respect to the axis of the shaft.

Still further objects of the invention will appear as the description thereof proceeds with reference to the accompanying drawings, in which.

Like reference characters indicate like parts throughout the several figures.

Figure 1:
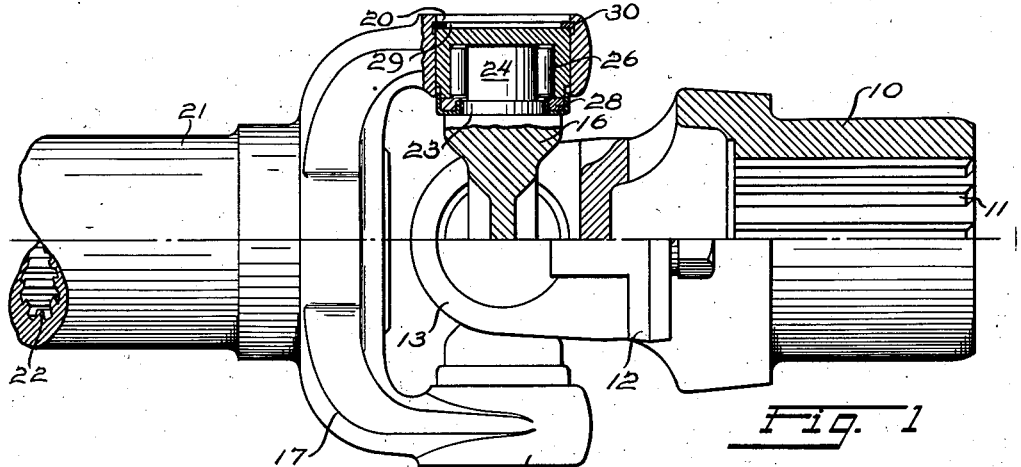
Figure 1 is an elevational view, partly in section of a preferred form of universal joint including the present invention.

In the preferred embodiment of the invention illustrated in Figures 1 to 7, inclusive, 10 designates a coupling member having internal splines 11 designed to receive the splined end of a shaft, the torque of which is to be transmitted to the universal joint presently to be described. Secured to the coupling member 10 in a manner, hereinafter described in detail, is a yoke member 12 having a pair of yoke arms 13 and 14 each provided with an eye-like opening 15 for the reception of oppositely disposed trunnions, and the bearings and bearing cups mounted thereon, of a spider member 16, through which the torque is transmitted to a yoke member 17, having yoke arms 18 and 19, each of which is likewise provided with an eye-like opening 20 for the reception of the other trunnions of the spider 16, and the bearing cups and bearings as hereinafter described.

The yoke member 17 is preferably formed integrally with a shaft coupling member 21 having internal splines 22 to receive the splined end of the shaft to which the torque is to be transmitted.

Preferably, the spider 16 is formed so as to provide an annular shoulder 23 at the base of each trunnion 24. A bearing cup 25 is telescoped on the end of each trunnion 24, a sleeve of rollers 26 being disposed between the side wall of each cup and each trunnion 24. The outer surface of the trunnion forms one race for the rollers and the inner surface of said wall forms the other race.

A seal is provided between the edge of the cup and the shoulder 23 at the base of each trunnion by a channel-shaped sheet metal ring 27, having a compressible gasket 28 in the channel thereof, against which the edge of the cup bears firmly when the bottom of the cup bears against the end of the trunnion. Preferably the outer wall of the channel-shaped sheet metal ring 27 overlaps the side wall of the cup as illustrated, clearance being provided between the overlapping outer wall of the channel-shaped ring 27 and the edges of the cup. An annular recess may be formed in the edge of the cup to receive the outer wall of the sheet metal ring 27 as illustrated. The bearing cups 25 fit within the eye-like openings in the yoke arms 18 and 19 and are held therein by snap-rings 29 sprung into grooves 30 cut in proper position in the walls in the openings in the yoke arms. The arrangement of the bearing cups, the rollers and the sealing means for the edge of the cup, as well as the manner of securing the bearing cups in the yoke arms 18 and 19 are more fully described in Patent No. 2,032,497 granted on March 3, 1936.

The present invention is particularly concerned with the coupling member 10 and the yoke member 12 and the way in which these members are united. Said members will now be described in detail. Member 10 has an enlarged cylindrical body portion 30' carrying flange like elements 31 and 32 extending radially in diametrically opposite directions from the body 30'. Lugs 33 and 34 project forwardly from the flange-like elements 31 and 32, respectively. Surfaces 35 and 36 of the element 31 are machined to be accurately at right angles to the axis of the shaft to which the socket member is intended to be applied. Surfaces 37 and 38 of the element 32 are finished in the same manner. The socket member may be hollowed between the surfaces 35, 36, 37 and 38 as illustrated in the drawings so that the yoke member will bear against said surfaces. The sides of the lugs 33 and 34 are finished so that said lugs fit as close as is practicable in recesses 39 and 40 cut into the body 41 of the yoke member. The surfaces 42 and 43 of the lugs 33 and 34 respectively are accurately finished so as to bear as closely as practicable against the bottom walls of the recesses 39 and 40 of the yoke member. The surfaces 42 and 43, at the ends of the lugs 33 and 34, are finished so as to be disposed the same distance from the axis of the shaft intended to be received by the shaft coupling member and to exert the proper pressure on the bearing cups as hereinafter pointed out. Openings 44 and 45 for cap screws or the like are formed in the flange like elements 31 and 32 beneath the lugs 33 and 34 as illustrated.

The body 41 of the yoke member has its back 46 finished parallel to the axis of the aligned eye-like openings 15 in the yoke arms 13 and 14, particularly where said back surface 46 contacts with the surfaces 35, 36, 37 and 38 of the coupling member. Tapped openings 47 and 48 are formed in the body 41.

The construction just described permits ready assembly of the universal joint and insures correct assembly thereof by relatively unskilled persons in the assembly line of an automobile or like factory, enabling all assembly operations, which might alter the characteristics of the joint to be made at the factory, which manufactures the universal joint. The spider and the bearing cups, the bearings, the packings and the sheet metal shells that receive the packings are all assembled and secured in the arms 18 and 19 of the yoke member 17 and in the arms 13 and 14 of the yoke member 12. The split spring rings 29 retain the bearing cups permanently in the arms 18 and 19 in proper position. The bearing cups in the openings in the arms 13 and 14 of the yoke member 12 are retained in the openings in said arms during shipment of this portion of the universal joint by pressing said cups into the yoke arms under slight pressure. If desired, however, the cups and the bearings therein may be retained in the arms 13 and 14 by removable clips or straps during shipment of this portion of the joint. The coupling member 10 is shipped to the point of assembly of the joint as a separate unit.

The joint may be assembled by inexperienced operators with a certainty that it will be properly assembled by sliding the coupling member 21 on one of the shaft sections thus connecting the spider 16, the yoke member 12 and all of the parts carried thereby to the shaft through which the torque is to be transmitted. The coupling member 10 is then slid upon the other shaft section and the lugs 33 and 34 of said coupling member are then reversely slid into the recesses 39 and 40 of the yoke member 12. As already pointed out said lugs fit snugly in said recess and accordingly pilot and properly locate the coupling member with respect to the yoke member 12. In assembled position the lugs 33 and 34 overhang the eye-like openings in the arms 13 and 14 and thus overlap the bearing cups 25 disposed in said openings when the joint has been assembled. Said lugs accordingly serve to positively retain the cups from the outward movement on the trunnions in which they are telescoped. After the parts have been assembled as just described cap screws are brought into threaded engagement with the threaded openings 47 and 48 in the body 46 of the yoke member 12 through the openings 44 and 45 of the flange-like elements 31 and 32.

It will be appreciated that proper assembly of the universal joint is assured inasmuch as the lugs 33 and 34, and the walls of the recesses with which they engage, definitely determine the location of the separate yoke and coupling members. The ends of the lugs furthermore serve as definitely located stops for the bearing cups which are assembled with the degree of pressure at the factory. Only sufficient clearance is provided between the lugs and the recesses of the yoke member to permit the parts to be slid into interlock relation. The bearing cups are related to the ends of the lugs in such a way that it is necessary to apply a slight pressure to bring said cups beneath the lugs. The torque transmitted through the coupling member 10 to the yoke member 12 is transmitted through the lugs 33 and 34, which, as already stated, provide an interlock between these two parts. The cap screws 49 and 50 are accordingly not relied upon to take the torque transmitted, said screws being utilized merely to maintain the interlock brought about by sliding the lugs 33 and 34 in the recesses 39 and 40 of the yoke member. This being the only way the joint can be assembled, it will be understood that no unbalance can be introduced in the assembled joint during the operation of completing the assembly, which operation is usually carried by unskilled operators.

Figure 2:
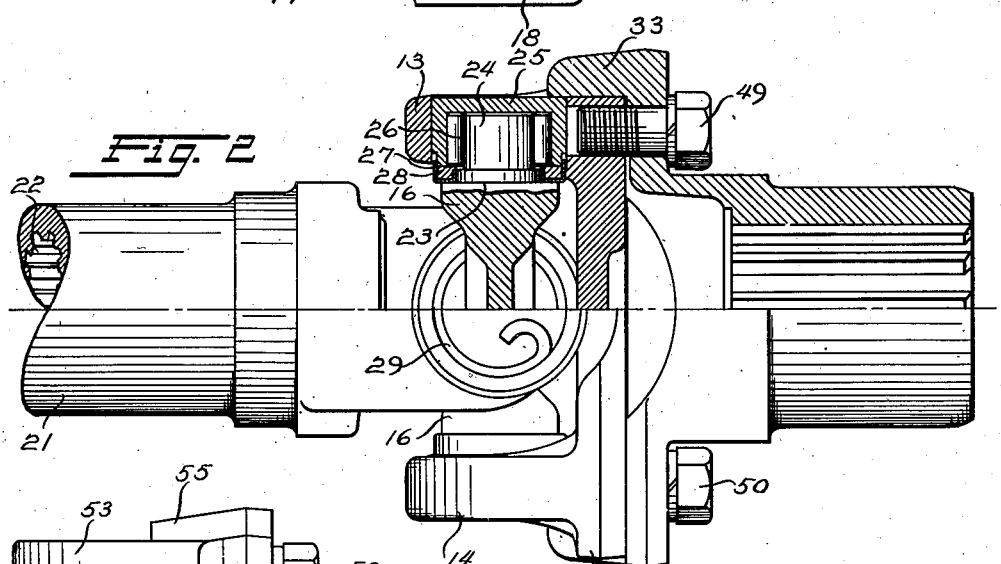
Figure 2 is a top plan view of the joint illustrated in Figure 1, parts of the joint being shown in section.

It will be understood by those skilled in the art that while the yoke member at the left of Figures 1 and 2 may be constructed as an integral part of the coupling member 21 as illustrated in these figures that, if desired, a separately constructed coupling member and yoke member like that used at the right of the joint illustrated in said figures may be employed, thus avoiding the necessity of cutting the grooves 30 that receive the spring snap rings 29, or the need for said rings. In other words, this invention contemplates the universal joint in which the construction at the left of Figures 1 and 2 is the same as that illustrated only at the right of said figures.

Figures 8, 9:
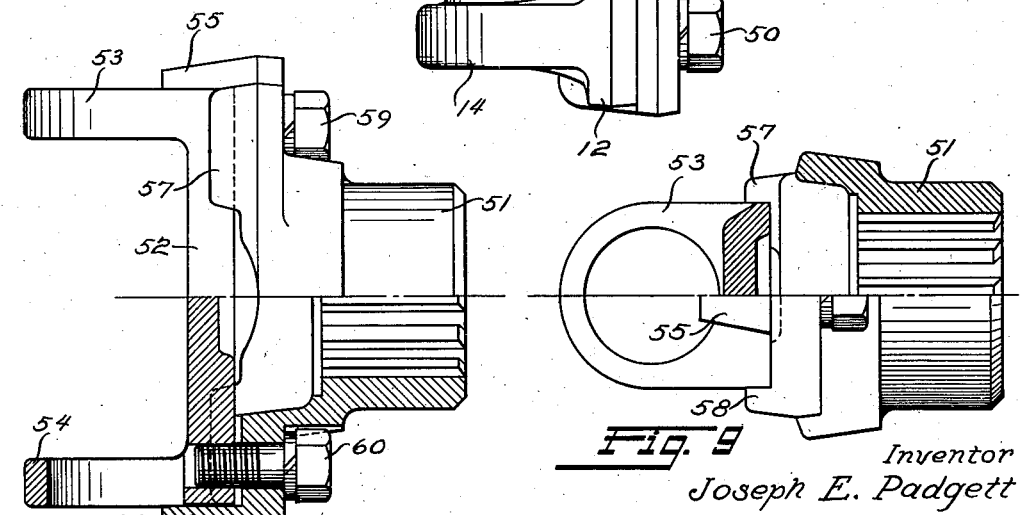
Figure 8 is a side elevation of a detachable yoke member and coupling member, partly in section, said view showing a modified construction.
Figure 9 is a top plan view of the modification of Figure 8, partly in cross-section.
Figure 3:
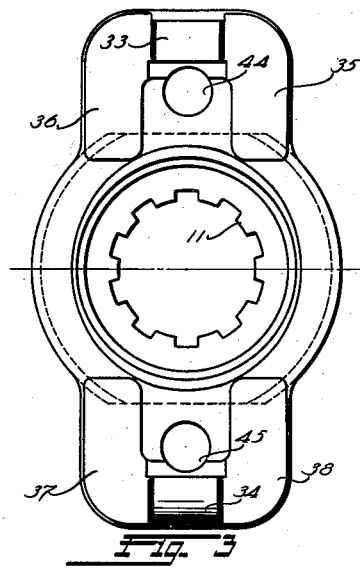
Figure 3 is an end view of the coupling member of the universal joint of the present invention.
Figure 4:
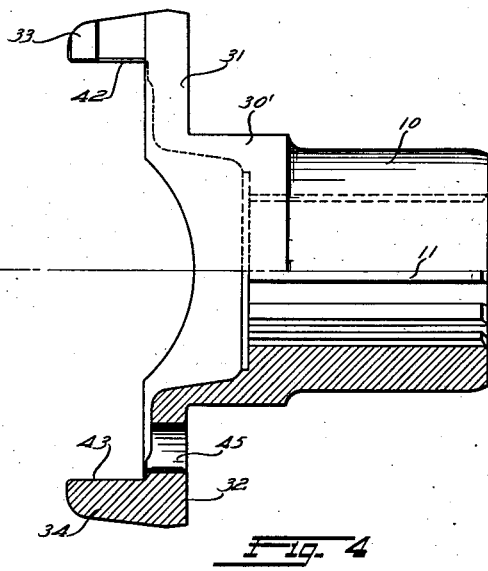
Figure 4 is a side elevational view partly in section of the coupling member illustrated in Figure 3.
Figure 6:
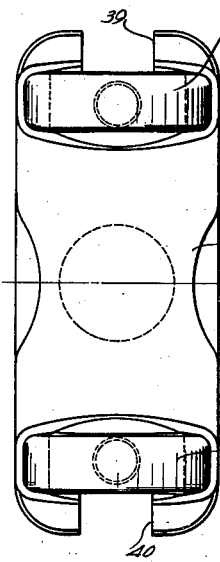
Figure 6 is an end elevational view of the yoke member designed to be interlocked with the coupling member of Figures 3, 4 and 5.
Figure 7:
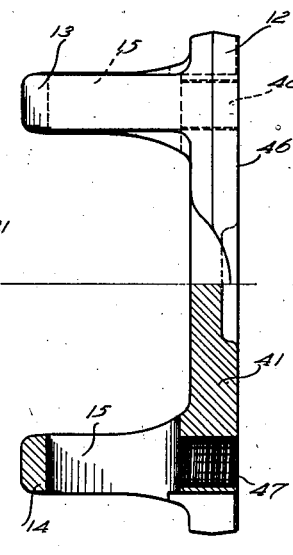
Figure 7 is a side view of the yoke member of Figure 6 partly in section.
Figure 5:
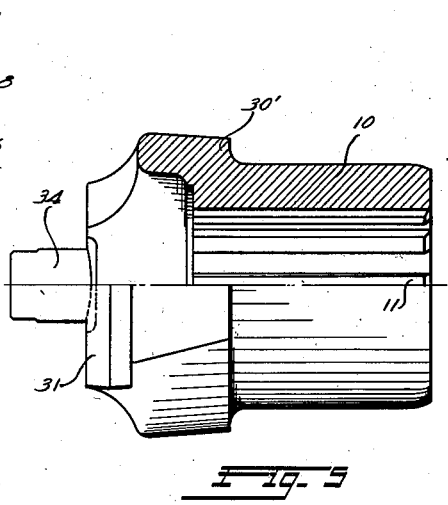
Figure 5 is a top plan view partly in section of the coupling member of Figures 3 and 4.

In the modification of the invention illustrated in Figures 8 and 9 of the drawings, the coupling member 51 is interlocked to the yoke member 52 having yoke arms 53 and 54 in a different way. In other respects, the modification of these figures is the same as that already described. The interlock between the coupling member 51 and the yoke member 52 is brought about by a pair of lugs 55 and 56 which merely overlap the ends of the yoke arms 53 and 54, and overhang the aligned openings therein so as to constitute stops for the bearing cups and the bearings therein after the spider has been assembled with respect to the yoke member. The body of the yoke member 52 is positioned laterally with respect to the coupling member 51 by being disposed snugly between flanges 57 and 58 bearing against opposite side walls of the yoke member 52 adjacent the arms 53 and 54. It will be understood that the surfaces of said flanges and the sides of the yoke member are machined to properly locate the yoke member with respect to the axis of the shaft of the joint when the parts are in assembled relation. Cap screws 59 and 60 secure the coupling member 51 and the yoke member 52 together. The modification just described is used in the same manner as that already described with reference to the preferred form of the invention.

It will be understood that while only two cap screws are employed in the illustrated embodiments of the invention to hold the coupling and yoke members together, that if desired a greater number of cap screws, such as four, for example, may be used if deemed necessary.

It will be observed that the universal joint just described is compact and easily assembled and that no portions of the yoke members, or the means for securing the yoke members to the spider project in a direction to limit the possible range of angular movement between the parts of the joint. The joint constructed according to the present invention has less weight for a given torque capacity and is produced at lower cost than possible with joints heretofore made.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A universal joint, comprising a spider having a pair of trunnions, cups containing bearings disposed on said trunnions, a yoke member having alined openings in which said trunnions are disposed, a shaft coupling member, means to detachably secure said members together, and lugs carried by said shaft coupling member and overlapping said cups to retain said cups and the bearings therein on said trunnions and to locate said spider with respect to the axis of said coupling member.

2. A universal joint, comprising a spider having a pair of trunnions, cups containing bearings disposed on said trunnions, a yoke member having alined openings in which said trunnions are disposed, a shaft coupling member, means to detachably secure said members together, and lugs carried by said shaft coupling member and overlapping said cups to retain said cups and the bearings therein on said trunnions and to locate said spider with respect to the axis of said coupling member, said lugs protruding through recesses in said yoke member so as to key said last named member to said shaft coupling member whereby said means to detachably secure said members together are substantially relieved of the torque transmitted through said joint.

3. A universal joint comprising a shaft coupling member, a separate yoke member having eye-like openings for the oppositely disposed trunnions of a spider, recesses in said yoke member, and lugs projecting from said shaft coupling member through said recesses and overhanging said eye-like openings, whereby said lugs provide abutments to locate said trunnions in said openings.

4. A universal joint comprising a shaft coupling member, a unitary separate yoke member having eye-like openings for the oppositely disposed trunnions of the spider, like lugs projecting from said shaft coupling member at opposite sides of the joint axis, recesses in said yoke member snugly receiving said lugs to interlock said members, and detachable means to maintain said interlock.

5. A universal joint, comprising a spider having oppositely extending trunnions, cups containing bearings disposed on said trunnions, a shaft coupling member, a separate yoke member having alined eye-like openings in which said trunnions and the cups thereon are disposed, lugs on said first named member providing abutments maintaining said cups on said trunnions, and means to detachably secure said members together.

6. A universal joint of the type employing cups containing bearings telescoped on the trunnions of the spider, including a shaft coupling member and a separate yoke member detachably connected to said coupling member, and lugs carried by said coupling member providing stops retaining certain of said cups on certain of said trunnions and centering said spider with respect to said coupling member.

7. A universal joint of the type employing cups containing bearings telescoped on the trunnions of the spider, including a shaft coupling member and a separate yoke member detachably connected to said coupling member, and lugs carried by said coupling member providing means to locate said yoke member with respect to said coupling member and to provide stops to retain certain of said cups on certain of said trunnions and to center said spider with respect to said coupling member.

8. A universal joint, comprising a shaft coupling member including flange-like means providing a pair of projections extending radially of said member, a lug protruding from each of said projections, said lugs having locating surfaces symmetrically disposed at opposite sides of the joint axis, a unitary yoke member comprising a body portion having recesses shaped to snugly receive said lugs and a pair of spaced yoke arms having alined openings to receive trunnions and bearings of a spider, and means to detachably secure said members together.

9. A universal joint comprising a shaft coupling member, a unitary separate yoke member having eye-like openings for the oppositely disposed trunnions of a spider, means to key said members together for simultaneous rotation, said means also preventing shifting of said members with respect to each other laterally of the joint axis, said key means consisting of a pair of like projections formed as an integral part of one of said members, said key means snugly fitting in recesses in the other member located at opposite sides of and equidistantly spaced from said axis, and means to detachably secure said members from movement in a direction parallel to or lengthwise of the joint axis.

JOSEPH EDWARD PADGETT.